United States Patent [19]

Brandstetter et al.

[11] Patent Number: 5,587,423
[45] Date of Patent: Dec. 24, 1996

[54] PREPARATION OF BLOCK COPOLYMERS BY IONIC POLYMERIZATION

[75] Inventors: Franz Brandstetter, Neustadt; Hermann Gausepohl, Mutterstadt; Reiner Thiele, Kaiserslautern, all of Germany

[73] Assignee: BASF Aktiengesellschaft, Ludwigshafen, Germany

[21] Appl. No.: 135,406

[22] Filed: Oct. 13, 1993

[30] Foreign Application Priority Data

Oct. 14, 1992 [DE] Germany .................. 42 34 601.0

[51] Int. Cl.$^6$ .................................................. C08F 297/04
[52] U.S. Cl. ................. 525/52; 525/53; 525/314; 526/64; 526/66; 526/76
[58] Field of Search .............. 525/52, 53, 314; 526/64, 66, 76

[56] References Cited

U.S. PATENT DOCUMENTS 4,346,193  8/1982  Warfel ........................ 525/52

Primary Examiner—James J. Seidleck
Assistant Examiner—I. Zemel
Attorney, Agent, or Firm—Keil & Weinkauf

[57] ABSTRACT

In a process for preparing block copolymers of styrene or its equivalents on the one hand and of butadiene or its equivalents on the other hand by sequential anionic polymerization, in which a first monomer and the organometallic compound serving as initiator are first of all combined to form a reaction mixture and the reaction is continued until at least part of the first monomer has been consumed, and then at least one further monomer is added and is in each case partially or completely reacted, the polymerization is carried out continuously in a conventional manner in a tubular reactor, the reaction of in each case one monomer being carried out in each case in one reactor section and at least two reactor sections being separated by a mixing stretch.

6 Claims, 1 Drawing Sheet

PREPARATION OF BLOCK COPOLYMERS BY IONIC POLYMERIZATION

BACKGROUND OF THE INVENTION

1. Field of the Invention

The present invention relates to a process for preparing block copolymers by anionic polymerization in tubular reactors.

The preparation of block copolymers from anionically polymerizable monomers has been known for a long time, and is generally performed in a batchwise manner in a stirred vessel, as described for example in German Patents 1,301,496 and 2,550,227.

In order to obtain polymer blocks having sharp transitions, the individual monomers must be reacted strictly sequentially, ie. in each case all of a monomer must have reacted before the next monomer is added. In principle this also applies to tapered transitions if they are to remain controlled, ie. if after the transition a purely homopolymeric block is finally to be obtained again. Only polymer solutions of low concentration are obtained, since otherwise the temperature increases to such an extent due to the polymerization that a thermal termination of the polymer chain occurs. All this results in a very poor space-time yield.

2. Description of Related Art

The preparation of block copolymers in a reactor cascade is described in DE-A-2111 966. The space-time yield may indeed be more favorable in this process if complete polymerization in the individual reaction zones is dispensed with, but then only polymers having regions with a random or largely random monomer distribution, ie. tapered transitions, are obtained.

SUMMARY OF THE INVENTION

It is an object of the present invention to prepare block copolymers of styrene or its derivatives on the one hand and of butadiene or its derivatives on the other hand by sequential anionic polymerization, preferably with sharp transitions at high space-time yields by a process in which a first monomer and the organometallic compound serving as initiator are first of all combined to form a reaction mixture and the reaction is continued until at least, part of the first monomer has been consumed, and then at least one further monomer is added and is in each case partially or completely reacted. The term space-time yield is understood to mean the yield of polymer that is formed, based on the effective reactor volume and also based on the time that elapses between the entry of the monomers and auxiliaries into the reactor and the discharge of the polymer solution from the reactor.

BRIEF DESCRIPTION OF THE DRAWING

The drawing shows a series of static mixers (1) and tubular reactors (2) joined alternately and sequentially.

DETAILED DESCRIPTION OF THE PREFERRED EMBODIMENTS

Figure 1:
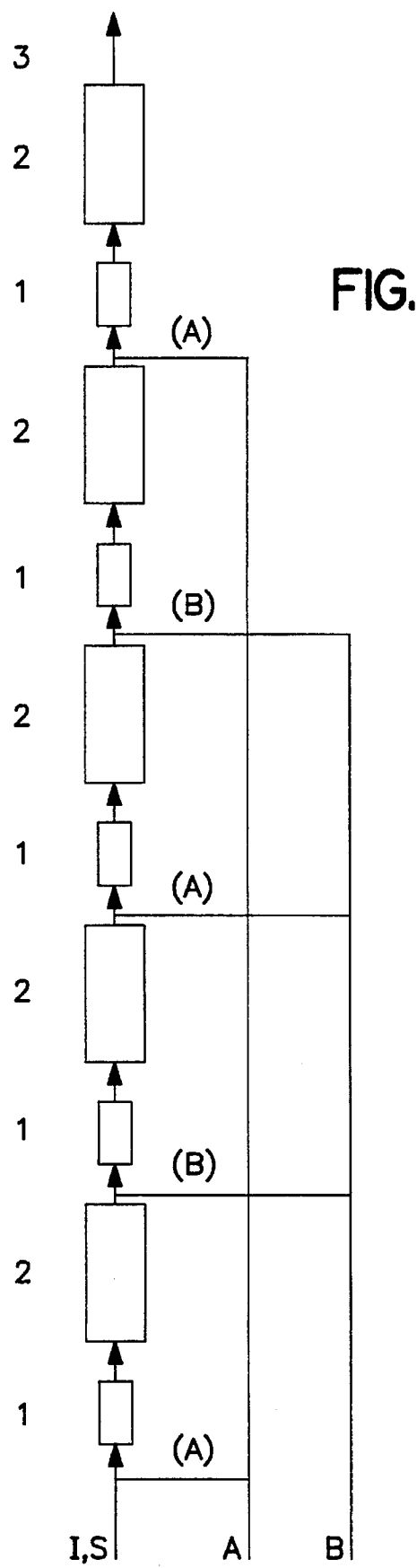

We have found that this object is achieved in accordance with the invention if the polymerization is carried out continuously in a conventional manner in a a sequence of tubular reactors, the reaction of in each case one monomer being carried out in each case in one reactor section and at least two reactor sections being separated by a static mixer or a stirred vessel.

For the preparation of, for example, a three-block copolymer A-B-A, three tubular reaction zones tubular arranged in series are thus necessary. A mixture of an inert solvent freed of proton-active substances together with the monomer A and also, separately, the initiator is fed to the first reaction zone. The monomer B is fed to the second reaction zone, and further monomer A is fed to the third zone. The first and second reaction zones are in each case followed by a static mixer or a stirred vessel, and the reaction zones and also the mixing stretches may be cooled. The reaction tubes are dimensioned so that sufficient residence time is provided in order that the monomer fed last may in each case be completely polymerized before the reaction mixture reaches the next zone. Block copolymers having sharp transitions between the blocks are thereby obtained. Tapered transitions can be achieved if the reaction in the individual reaction tubes is not carried to completion, mixtures of monomers being allowed for certain periods of time, or if small amounts of polar compounds, for example tetrahydrofuran, are added.

As is customary with anionic polymerization processes, the ratio of the amount of initiator to the amount of monomer determines the block length in the polymer. In general the total amount of initiator is fed to a mixing element upstream of the first reaction zone. However, the metering in of the initiator may also be distributed over two or more reaction zones, and block copolymer mixtures of different block lengths are thereby obtained.

The polymerization is conveniently carried out at from 20° to 150° C., and preferably from 35° to 120° C.

Suitable styrene monomers are, for example, styrene and its derivatives, α-methylstyrene, vinyltoluene or tert-butylstyrene. Suitable butadiene derivatives are dimethylbutadiene and isoprene.

Inert hydrocarbons may be used as solvents. Suitable compounds include aliphatic, cycloaliphatic or aromatic hydrocarbons that are liquid under the reaction conditions and contain from 4 to 12 carbon atoms.

Examples include pentane, cyclohexane, methylcyclohexane, toluene, ethylbenzene or xylene.

Suitable initiators for the polymerization are the known monolithium hydrocarbons of the formula RLi, where R is an aliphatic, cycloaliphatic, aromatic or mixed aromatic-aliphatic hydrocarbon. The hydrocarbon may contain 1 to 12 carbon atoms. Examples of the aforedescribed initiators are: methyllithium, ethyllithium, n- or sec-butyllithium, isopropyllithium, cyclohexyllithium or phenyllithium. In particular preference is given to n- or sec-butyllithium.

A suitable apparatus for carrying out the process according to the invention is shown in the figure and comprises a series of segments (1, 2), each of which has a static mixer 1 and a tubular reactor 2, Suitable static mixers are, for example, commercially available rigid internal fittings, packings or sequences of simple perforated plates whose perforations are in each case arranged staggered. Customary static mixers are sold under the trade names SMX and SMR by Sulzer AG, Winterthur, Switzerland. The different monomers—in the present case two monomers A and B are indicated—are in each case added separately.

The process according to the invention is suitable for preparing thermoplastics, in particular thermoplastics based on styrene and butadiene, and also for preparing thermoplastic elastomers, where instead of the linear block structure polymers which are built up in a star-shaped manner can also be obtained if, after the completion of the polymerization, the living chain ends are coupled in a known manner using a polyfunctional compound and are then terminated in a further reaction zone, comprising, for example, a static mixer.

Suitable polyfunctional compounds are, for example, divinylbenzene, silicon tetrachloride, difunctional or trifunctional esters, aldehydes, ketones and polyfunctional epoxides, for example the products obtainable under the tradename Edenol® B 316 or B 81 from Henkel.

After the end of the polymerization and coupling the reaction products are treated with a proton-active substance, for example an alcohol or a mixture of $CO_2$ and water. Finally, the polymer solutions are freed in the usual way from solvent, and stabilizers, anti-oxidants, lubricants, etc., are added as necessary.

EXAMPLE 1

Preparation of an SBS block copolymer

An apparatus comprising in all four segments is used to carry out the invention. Each segment contains a tubular reactor of diameter 5 cm and length 800 cm, containing built-in SMR elements. A downstream static mixer containing SMX elements is connected to each segment except the last one. Each tubular segment has a metering device for monomers. The first segment additionally contains a device for the initiator solution. The aforementioned internal fittings and their mode of action are described, for example, in the relevant literature of the manufacturer Sulzer AG, Wintertur, Switzerland.

Freshly distilled styrene and methylcyclohexane, each of which had previously been dried over $Al_2O_3$, were mixed in a ratio of 1:6 and fed at a rate of 127 kg/h to the first tubular segment. At the same time a 12% strength solution of sec-butyllithium in methylcyclohexane was metered in at a rate of 0.12 kg/h. Butadiene that had been dried over a molecular sieve and freed from stabilizer was fed at a rate of 3.8 kg/h to both the second and third tubular segments. Styrene was fed at a rate of 9.6 kg/h into the fourth reactor. The mean polymerization temperatures in the reactors were, in the sequence of the polymer flow, 65° C., 75° C., 75° C. and 90° C.

The polymer solution at the end of the last reactor was collected, treated with $CO_2$ and water, and then freed from solvent.

The molecular weights of the blocks in the SBS polymer were as follows: $S_1$: 82,000 g/mol, B: 34,000 g/mol, and $S_2$: 43,000 g/mol.

The space-time yield was 0.50 kg/l·h.

EXAMPLE 2

The experiment according to Example 1 was repeated, except that 5.0 kg/h of styrene instead of butadiene was metered into the third segment, and Edenol B 316 from Henkel instead of styrene was metered into the fourth segment.

The space-time yield was 0.58 kg/l·h.

The mean molecular weight was 245,000 mol/g and the coupling yield (ratio of coupled to non-coupled material) was 72%.

EXAMPLE 3

A block copolymer $B_1SB_2$ was prepared as described in Example 1 and with appropriate modifications. The molecular weights were: $B_1$: 63,000 mol/g, $B_2$: 22,000 mol/g and S: 84,000 mol/g.

The space-time yield was 0.4 kg/l·h.

We claim:

1. A process for preparing block copolymers of styrene and of butadiene by sequential anionic polymerization in a series of at least two sequential tubular reactors, in which a first monomer and an organometallic compound serving as initiator are combined to form a first reaction mixture and are reacted (polymerized) until at least part of said first monomer has been consumed, and then at least one further monomer is added to said reacted first or further mixture and reacted in a subsequent tubular reactor, wherein each tubular reactor is followed by a static mixer or a stirred vessel.

2. A process as claimed in claim 1, wherein the feeding in of the monomer forming the second or further polymer blocks is carried out in each case upstream of a static mixer or stirred vessel.

3. A process as claimed in claim 1, wherein the residence time and/or the volume of the static mixer or stirred vessel is a fraction of that of the in each case following tubular reactor.

4. A process as claimed in claim 1, wherein the mixing temperature does not exceed 150° C. at any point of a tubular reactor.

5. A process as claimed in claim 1, wherein at least one tubular reactor comprises a zone or part having internal fittings and at least in some places cooling surfaces.

6. A process as claimed in claim 1, wherein in each case part of the aforementioned amount of initiator is fed to the inlet of the tubular reactor and further parts are fed at least to one further reactor section.

* * * * *